(12) United States Patent
Feuer et al.

(10) Patent No.: US 7,777,790 B2
(45) Date of Patent: Aug. 17, 2010

(54) ACQUISITION OF IMAGE SEQUENCES WITH ENHANCED RESOLUTION

(75) Inventors: Arie Feuer, Haifa (IL); Nir Maor, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 1510 days.

(21) Appl. No.: 11/045,611

(22) Filed: Jan. 27, 2005

(65) Prior Publication Data

US 2006/0165179 A1    Jul. 27, 2006

(51) Int. Cl.
*H04N 5/262*   (2006.01)
*H04N 5/228*   (2006.01)
*H04N 7/12*    (2006.01)
*H04N 11/02*   (2006.01)
*H04N 11/04*   (2006.01)
*G06K 9/36*    (2006.01)
*G06K 9/46*    (2006.01)

(52) U.S. Cl. .............. 348/239; 348/222.1; 375/240.08; 382/236

(58) Field of Classification Search ............... 348/142, 348/153–155, 161, 169, 584; 382/112, 171, 382/105, 125–127; 375/240.18, 240.08
See application file for complete search history.

(56) References Cited

U.S. PATENT DOCUMENTS

| | | | | |
|---|---|---|---|---|
| 7,043,059 | B2* | 5/2006 | Cheatle et al. | 382/112 |
| 2003/0090571 | A1* | 5/2003 | Scheurich | 348/207.1 |
| 2004/0001149 | A1* | 1/2004 | Smith | 348/218.1 |
| 2005/0052553 | A1* | 3/2005 | Kido et al. | 348/296 |
| 2005/0128307 | A1* | 6/2005 | Kobayashi et al. | 348/208.1 |
| 2006/0181643 | A1* | 8/2006 | De Haan | 348/458 |

FOREIGN PATENT DOCUMENTS

JP    2003-203237    *    7/2003

* cited by examiner

*Primary Examiner*—Kelly L Jerabek
(74) *Attorney, Agent, or Firm*—Husch Blackwell Sanders Welsh & Katz

(57) ABSTRACT

A method for electronic imaging includes controlling an image sensor to capture a first sequence of first input images at a first frame rate having a first spatial resolution, and to capture a second sequence of second input images, interleaved with the first sequence and having a second spatial resolution lower than the first spatial resolution. The first and second sequences of the input images are processed to generate an third sequence of output images at a second frame rate higher than the first frame rate and having a third spatial resolution higher than the second spatial resolution.

14 Claims, 8 Drawing Sheets

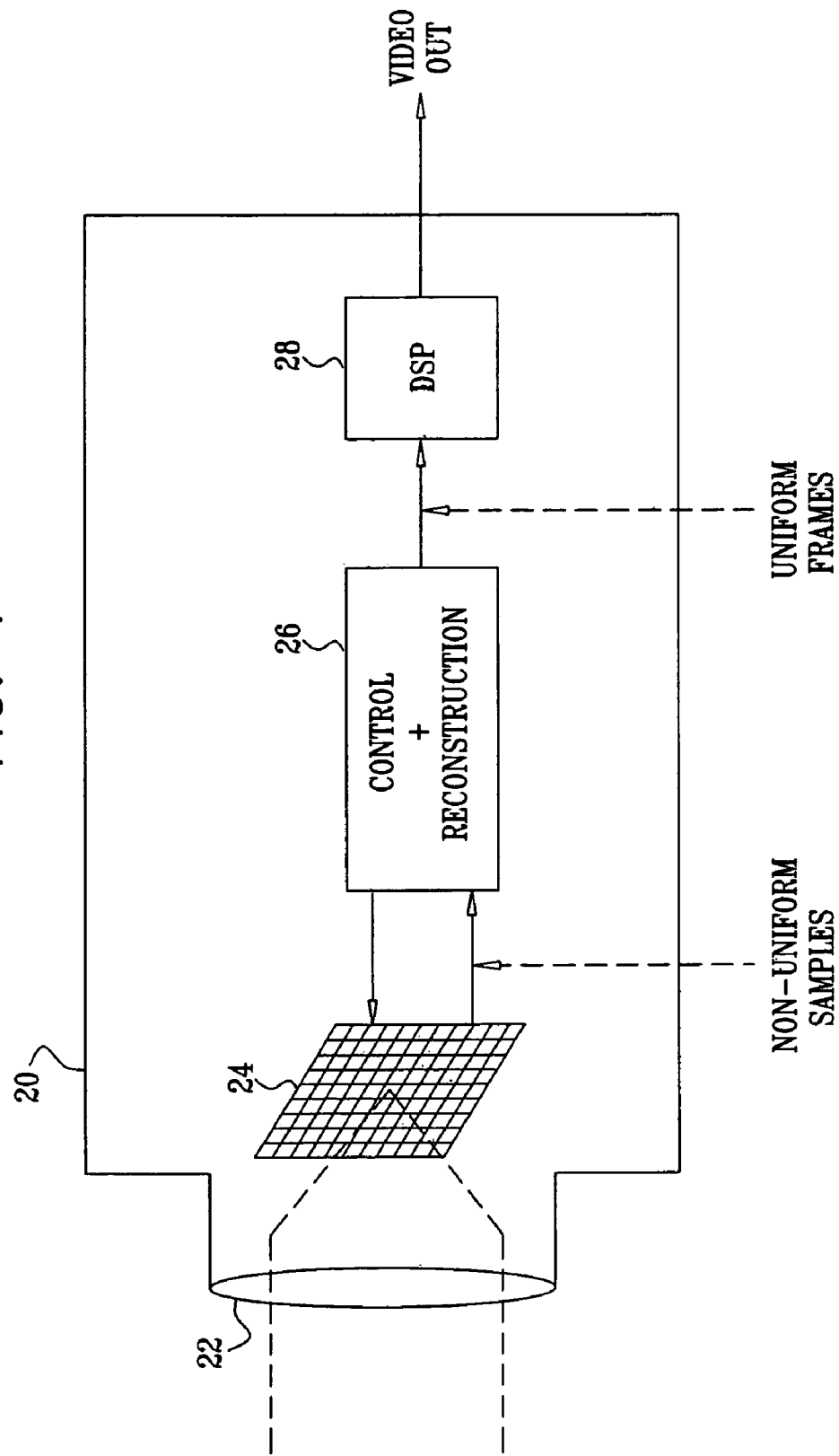

ACQUISITION OF IMAGE SEQUENCES WITH ENHANCED RESOLUTION

FIELD OF THE INVENTION

The present invention relates generally to methods and devices for electronic image acquisition and processing, and specifically to methods for enhancing the spatial and/or temporal resolution of video image sequences based on non-uniform sampling of image points.

BACKGROUND OF THE INVENTION

Recent advances in image sensor technology have led to remarkable increases in the resolution of digital cameras. Similar advances have occurred in display technology. Consumer-grade digital still cameras and displays are now capable of capturing and presenting multi-megapixel images.

The spatial and temporal resolution of image sequences that are captured by video cameras, however, is still much lower than the available sensor and display resolution. For example, while high-definition television (HDTV) screens are capable of displaying images of 1280×720 pixels at 60 frames/sec, the resolution of standard NTSC video cameras is no better than 720×480 pixels at about 30 frames/sec. One reason for this limitation is the low readout rate (in pixels/sec) of the image sensor devices used in these cameras. In other words, image sensors can generally provide their maximal spatial resolution only at low temporal resolution (i.e., low frame rate), or conversely, maximal temporal resolution at low spatial resolution. The maximal readout rate of the image sensor is generally insufficient to support maximal spatial and temporal resolution simultaneously.

There are methods known in the art for compressing a video stream in order to reduce the data rate required to transmit images at a certain spatial resolution and frame rate. Such methods, however, are applicable to a sequence of video frames after acquisition and do not address the restriction imposed during image acquisition by the limited readout rate of the image sensor.

SUMMARY OF THE INVENTION

Embodiments of the present invention provide methods and devices for enhancing the spatial and/or temporal resolution of image sequences captured by an image sensor, notwithstanding the inherent readout rate constraint of the sensor. This resolution enhancement is achieved by non-uniform sampling of the image sensor output in the spatial and temporal domains.

In some embodiments of the present invention, an image sensor is controlled to capture an interleaved sequence of input images of varying resolution. Typically, the sequence includes a first sequence of input images with high spatial resolution and a second sequence of input images, interleaved among the high-resolution images, that have low spatial resolution. Due to the readout limitations of the sensor, the temporal resolution may vary, as well, i.e., the high-resolution input images may take longer to read out of the sensor than the low-resolution input images. (As a result, the input images with low spatial resolution typically have higher temporal resolution.)

The interleaved sequences of input images are processed together in order to reconstruct an output sequence of images with high spatial and temporal resolution. In other words, the spatial resolution of the output images is higher than that of the low-resolution input images, and the interval between frames of the output sequence is typically less than the readout time of the high-resolution input images. In some embodiments, the output sequence is generated at a standard video frame rate, such as 30 or 60 frames/sec, at the full spatial resolution of the high-resolution input images. The resolution enhancement is gained by means of joint spatio-temporal processing of the input images, taking advantage of the frequency structure of the information in the input image sequence in the spatial and temporal domains.

Many commercially-available image sensors now have the capability of operating at different spatial resolution levels (typically by skipping rows and/or columns during readout) and at different frame rates. In video cameras known in the art, however, the frame rate and resolution of the sensor readout are held constant over all the frames in a video sequence. In some embodiments of the present invention, on the other hand, a sensor controller controls the functions of a conventional image sensor so that the sensor generates interleaved frames of differing resolution. These frames are then processed as described above to produce an output image sequence with enhanced resolution.

There is therefore provided, in accordance with an embodiment of the present invention, a method for electronic imaging, including:

controlling an image sensor to capture a first sequence of first input images at a first frame rate having a first spatial resolution, and to capture a second sequence of second input images, interleaved with the first sequence and having a second spatial resolution lower than the first spatial resolution; and processing the first and second sequences of the input images to generate an third sequence of output images at a second frame rate higher than the first frame rate and having a third spatial resolution higher than the second spatial resolution.

In a disclosed embodiment, the third spatial resolution is equal to the first spatial resolution. Additionally or alternatively, controlling the image sensor includes capturing the second input images at a third frame rate, which is equal to the second frame rate.

In some embodiments, the second frame rate is equal to a standard video output rate. Typically, the image sensor includes an array of detector elements arranged in a matrix of rows and columns, and controlling the image sensor includes capturing the second input images by skipping a subset of at least one of the rows and the columns during readout of the detector elements.

In disclosed embodiments, the first and second input images are sampled according to a non-uniform spatio-temporal sampling pattern, and processing the first and second sequences includes determining a spatio-temporal filtering function responsively to the sampling pattern, and applying the spatio-temporal filtering function to the first and second input images. In one embodiment, applying the spatio-temporal filtering function includes computing a set of spatio-temporal filtering functions responsively to a structure of the sampling pattern in a spatio-temporal frequency domain, and convolving the first and second input images with the spatio-temporal filtering functions.

In some embodiments, the image sensor includes a color mosaic image sensor, and the output images include color images.

There is also provided, in accordance with an embodiment of the present invention, electronic imaging apparatus, including:

an image sensor; and a sensor controller, which is coupled to control the image sensor so as to capture a first sequence of first input images at a first frame rate having a first spatial resolution, and to capture a second sequence of second input images, interleaved with the first sequence and having a second spatial resolution lower than the first spatial resolution, wherein the controller is adapted to process the first and second sequences of the input images to generate an third sequence of output images at a second frame rate higher than the first frame rate and having a third spatial resolution higher than the second spatial resolution.

There is additionally provided, in accordance with an embodiment of the present invention, a method for image compression, including:

receiving an input sequence of input images at an input frame rate, the input sequence having uniform spatial and temporal resolution; and selectively decimating the input images in accordance with a non-uniform spatio-temporal sampling pattern so as to generate a compressed image sequence including:

a first sequence of first images having a first spatial resolution at a first frame rate less than the input frame rate; and a second sequence of second images, interleaved with the first sequence and having a second spatial resolution lower than the first spatial resolution and a second frame rate greater than the first frame rate.

In a disclosed embodiment, the first spatial resolution is equal to the uniform spatial resolution of the input images, and the second frame rate is equal to the input frame rate.

Typically, the method further includes processing the compressed image sequence to reconstruct a decompressed sequence of output images at an output frame rate higher than the first frame rate and having an output spatial resolution higher than the second spatial resolution.

There is moreover provided, in accordance with an embodiment of the present invention, a computer software product, including a computer-readable medium in which program instructions are stored, which instructions, when read by a computer, cause the computer to receive an input sequence of input images at an input frame rate, the input sequence having uniform spatial and temporal resolution, and to selectively decimating the input images in accordance with a non-uniform spatio-temporal sampling pattern so as to generate a compressed image sequence including:

a first sequence of first images having a first spatial resolution at a first frame rate less than the input frame rate; and a second sequence of second images, interleaved with the first sequence and having a second spatial resolution lower than the first spatial resolution and a second frame rate greater than the first frame rate.

The present invention will be more fully understood from the following detailed description of the embodiments thereof, taken together with the drawings in which:

BRIEF DESCRIPTION OF THE DRAWINGS

FIG. 1 is a block diagram that schematically illustrates a digital video camera with resolution enhancement, in accordance with an embodiment of the present invention;

DETAILED DESCRIPTION OF EMBODIMENTS

Figure 2A:
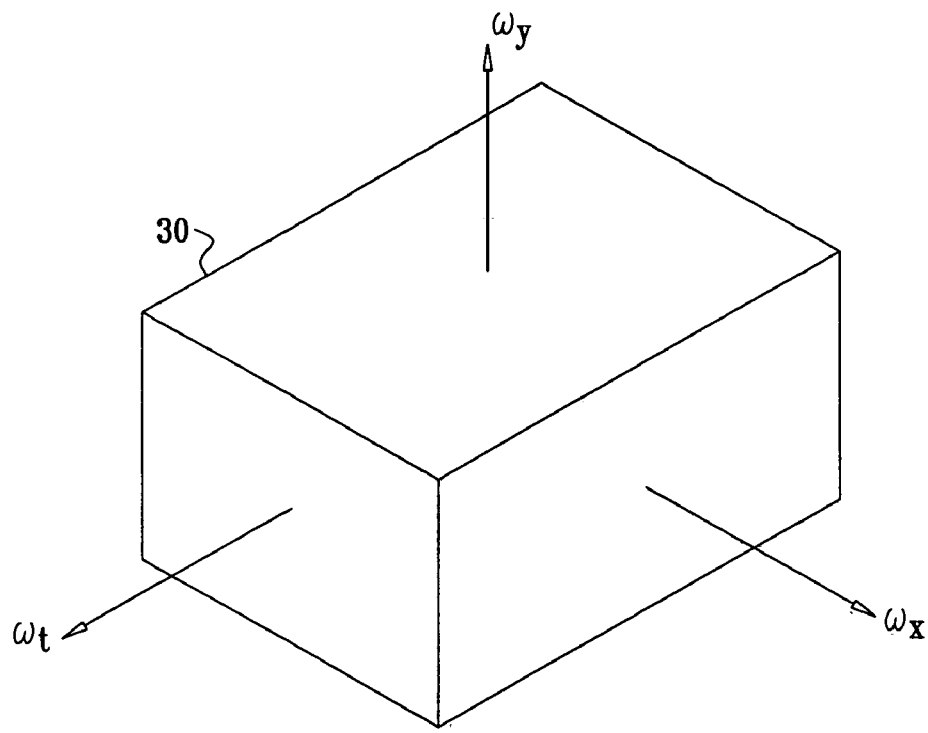
FIG. 2A is a plot that schematically illustrates the energy content of a time-varying scene in the spatio-temporal frequency domain.

FIG. 1 is a block diagram that schematically illustrates a video camera 20 with enhanced resolution, in accordance with an embodiment of the present invention. In the context of the present patent application and in the claims, the term "camera" is used broadly to refer to any and all sorts of electronic image capture devices that are capable of capturing sequences of moving images. Objective optics 22 focus an image of a scene onto an image sensor 24. The image sensor may be of any suitable type known in the art. For example, the image sensor may comprise a charge-coupled device (CCD) detector array or a complementary metal oxide semiconductor (CMOS) detector array. These sensor types (and other solid-state image sensors known in the art) comprise readout circuits that shift accumulated photocharge out of the detector elements in the array row-by-row at a readout rate Q, which is limited by hardware design constraints of the image sensor device.

A sensor controller 26 provides timing and control signals to sensor 24, and thus controls the resolution and output frame rate of the sensor. Controller 26 instructs the sensor to output some frames with high spatial resolution (up to the full available resolution of the sensor), and to output other frames with lower spatial resolution. In CCD and CMOS image sensors known in the art, the resolution may be varied in this way, for example, by reading out only some of the rows of detector elements, while skipping over the others. In some CMOS image sensors, it is also possible to skip columns. Alternatively, sensor 24 may comprise custom readout circuits that permit selective readout of individual detector elements. In any case, when fewer detector elements are read out in a given frame, the time required for readout is reduced. Therefore, the frames with lower spatial resolution typically have higher temporal resolution than the frames with high spatial resolution. Thus, the image signals read out of sensor 24 to controller 26 typically have non-uniform sampling resolution in both the spatial and temporal domains.

Controller 26 processes the frames of non-uniform samples, as described hereinbelow, in order to reconstruct a sequence of output frames with uniform resolution, i.e., at a constant frame rate and with the same number of pixels in each successive frame. In other words, the sequence of output frames typically has the general form expected of the output of a video image sensor, but with enhanced spatial and/or temporal resolution. A digital signal processor (DSP) 28 processes the output frames, using methods of video signal processing known in the art, in order to generate a standard video output signal, such as a NTSC (monochrome or color), Y/C or RGB video output. Alternatively, camera 20 may be configured to generate a non-standard image sequence output, in substantially any suitable image format. The term "DSP" is used in the broad, functional sense of the term. In other words, the functions of DSP 28 may be carried out by one or more hard-wired or programmable logic or computational devices or by a microprocessor with suitable software or by any combination of such components.

Figure 2B:
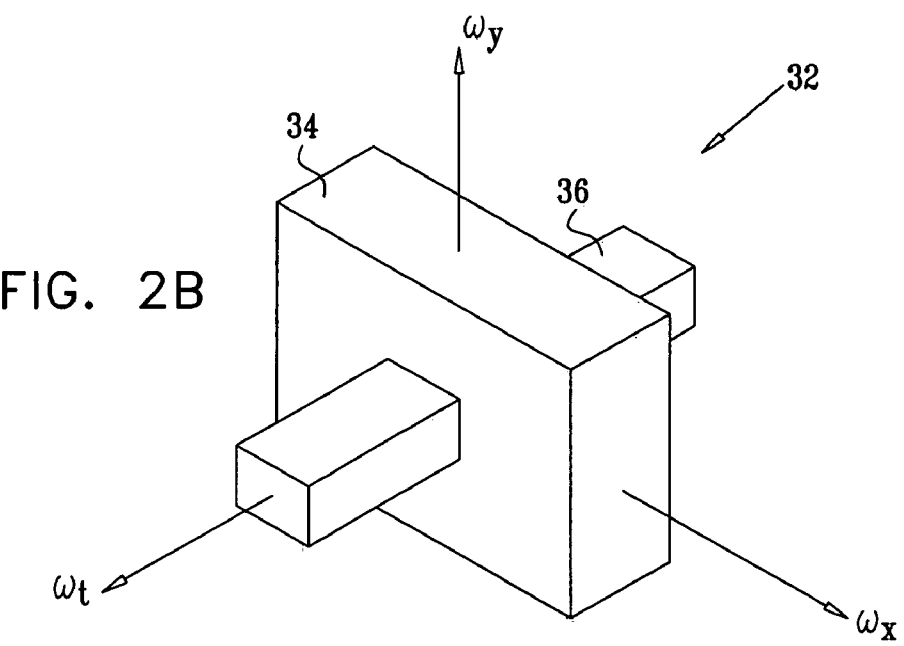
FIG. 2B is a plot that schematically illustrates a reduced volume in the spatio-temporal frequency domain in which most of the information in the time varying scene of FIG. 2A is located, in accordance with an embodiment of the present invention.

Reference is now made to FIGS. 2A and 2B, which schematically illustrate the principle of operation of camera 20, in accordance with an embodiment of the present invention. FIG. 2A is a plot that illustrates the energy content of a time-varying scene in the spatio-temporal frequency domain. A sampling volume 30 shown in this figures can be captured by uniform sampling at sufficiently high sampling rate, both temporal and spatial.

A typical image sensor, like sensor 24, has a maximal spatial resolution $N_{MAX}$, which is determined by the number of detector elements in the array. The sensor similarly has a maximal temporal resolution, $F_{MAX}$, which is determined by the number of frames/sec at which the sensor is capable of operating. Thus, the information content (or energy content) of a sequence of frames captured by the sensor can be seen as sampling volume 30 in spatio-temporal frequency space ($\omega_x$, $\omega_y$, $\omega_t$). The bounds of this volume are determined by $N_{MAX}$ and $F_{MAX}$.

In order to achieve the full spatial and temporal resolution represented by volume 30, it is necessary that the readout rate of the image sensor, Q, satisfy the condition that $Q \geq N_{MAX} \times F_{MAX}$. In practice, however, due to hardware constraints in the design and fabrication of the image sensor, the maximal readout rate $Q_{MAX}$ is considerably smaller, i.e., $Q_{MAX} \ll N_{MAX} \times F_{MAX}$. Therefore, in digital video cameras known in the art, either the spatial or temporal resolution is reduced in order to meet the readout rate constraint. Conceptually, either volume 30 is flattened toward the ($\omega_x$, $\omega_y$) plane, as in digital still cameras, or it is restricted to a long, narrow volume around the $\omega_t$ axis, as in full-motion video cameras.

FIG. 2B is a plot that schematically illustrates a reduced volume 32 in the spatio-temporal frequency domain, in which most of the information in the time varying scene of FIG. 2A is located. The shape of volume 32 is captured by non-uniform sampling in accordance with an embodiment of the present invention. The choice of volume 32 is based on the realization that most of the useful information content in a sequence of images is concentrated close to the axes. In other words, rapid variations (high $\omega_t$) are significant only at low spatial frequencies, and fine detail (high $\omega_x$ and/or $\omega_y$) can be updated with relatively low temporal frequency. Volume 32 thus comprises a high spatial frequency component 34 with a low temporal frequency range, and a high temporal frequency component 36 with a low range of spatial frequencies. Controller 26 processes the image samples captured within volume 32 in order to reconstruct an output image sequence that approximates volume 30, notwithstanding the limited readout rate of image sensor 24.

Figure 3:
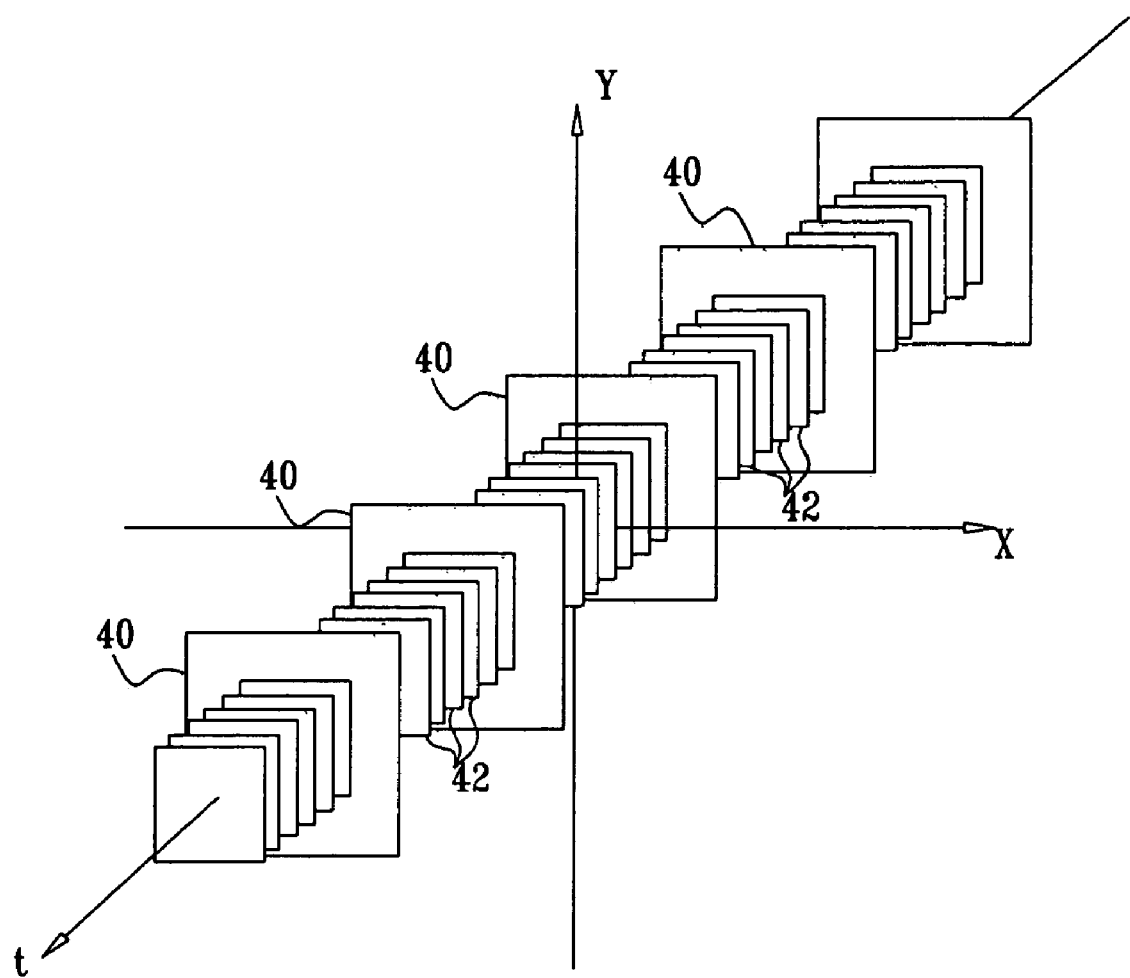
FIG. 3 is a plot that schematically illustrates a sequence of interleaved input images of varying resolution captured by an image sensor, in accordance with an embodiment of the present invention.

FIG. 3 is a plot that schematically illustrates a multi-resolution sequence of input images captured by sensor 24 under the control of controller 26, in accordance with an embodiment of the present invention. The sequence comprises high-resolution frames 40 interleaved with low-resolution, high-speed frames 42. This sequence corresponds, in the time domain, to sampling volume 32, with high-resolution frames 40 contributing particularly to component 34, while high-speed frames 42 contribute particularly to component 36. The high-resolution frames may be captured at the full resolution of sensor 24, but at a low frame rate, i.e., with a time interval between frames 40 that is longer than the target frame interval of the output video sequence from camera 20. (Typically, the high-resolution frames have a long readout time due to the limitation on $Q_{MAX}$, as noted above.) The low-resolution frames are captured at the target frame rate, or even faster if desired, by skipping rows and/or columns or selected pixels during sensor readout. Although the image sequence shown in FIG. 3 comprises frames 40 and 42 of only two types, camera 20 may alternatively be programmed to capture and process input images at three or more different levels of spatial and temporal resolution.

As noted above, controller 26 processes frames 40 and 42 in order to reconstruct an output image sequence at a target frame rate. The output images in the output image sequence have higher spatial resolution than frames 42, and may have the full spatial resolution of frames 40 (or even higher apparent resolution, by means of super-resolution enhancement techniques known in the art). Details of an exemplary reconstruction method are described hereinbelow.

Figure 4:
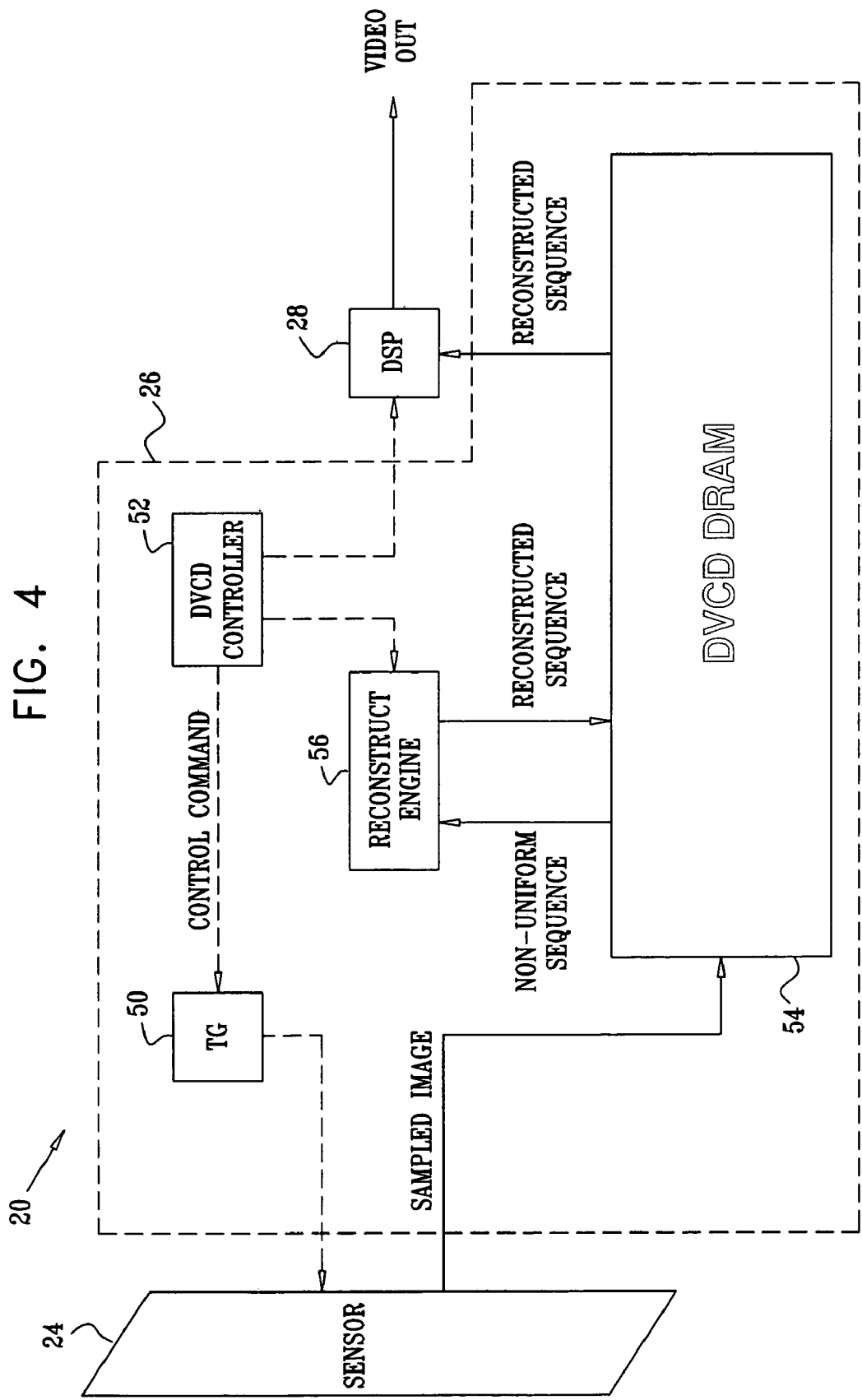
FIG. 4 is a block diagram that schematically shows details of a digital video camera with resolution enhancement, in accordance with an embodiment of the present invention.

FIG. 4 is a block diagram that schematically shows details of controller 26, in accordance with an embodiment of the present invention. This diagram is shown by way of example, as an aid to understanding of one possible implementation of the present invention. Elements of camera 20 that are not necessary to such an understanding (such as analog components) are omitted for the sake of simplicity. The functional blocks of controller 26 that are shown in FIG. 4 may be produced together on a single integrated circuit chip or chip set, possibly together with DSP 28. Alternatively, controller 26 may comprise a number of discrete components and/or programmable logic elements. Furthermore, at least some of the functions of controller 26 may be carried out by a microprocessor under software control. All of these alternative implementations are considered to be within the scope of the present invention.

Controller 26 comprises a timing generator (TG) 50, which issues timing signals to image sensor 24 in order to cause the image sensor to generate an input image sequence with non-uniform spatial and temporal sampling, such as the sequence shown in FIG. 3. The timing generator, as well as other elements of camera 20, is controlled by a digital video capture device (DVCD) controller 52, which determines the timing and resolution of the frames in the input and output image sequences. The output resolution and frame rate of camera 20 may be fixed or, alternatively, these parameters may be variable. For example, a user of camera 20 may select the desired resolution and frame rate, or DVCD controller 52 may determine the sampling pattern adaptively based on analysis of the image statistics. When the resolution and/or frame rate is varied, the DVCD controller determines the appropriate spatial and temporal resolution parameters to use in the input image sequence and controls timing generator 50 accordingly.

Input image samples that are output by sensor 24 (with non-uniform sampling in the spatial and temporal domains) are stored in a memory 54, such as a DVCD dynamic random access memory (DRAM) 54. A reconstruction engine 56 processes the samples in order to reconstruct an image sequence with uniform, enhanced resolution. The reconstruction engine receives timing and processing parameters, as required, from DVCD controller 52. Typically, the reconstruction engine stores the reconstructed images in memory 54, for subsequent processing by DSP 28. Alternatively, the reconstruction engine and DSP may be arranged in a pipeline architecture.

Figure 5:
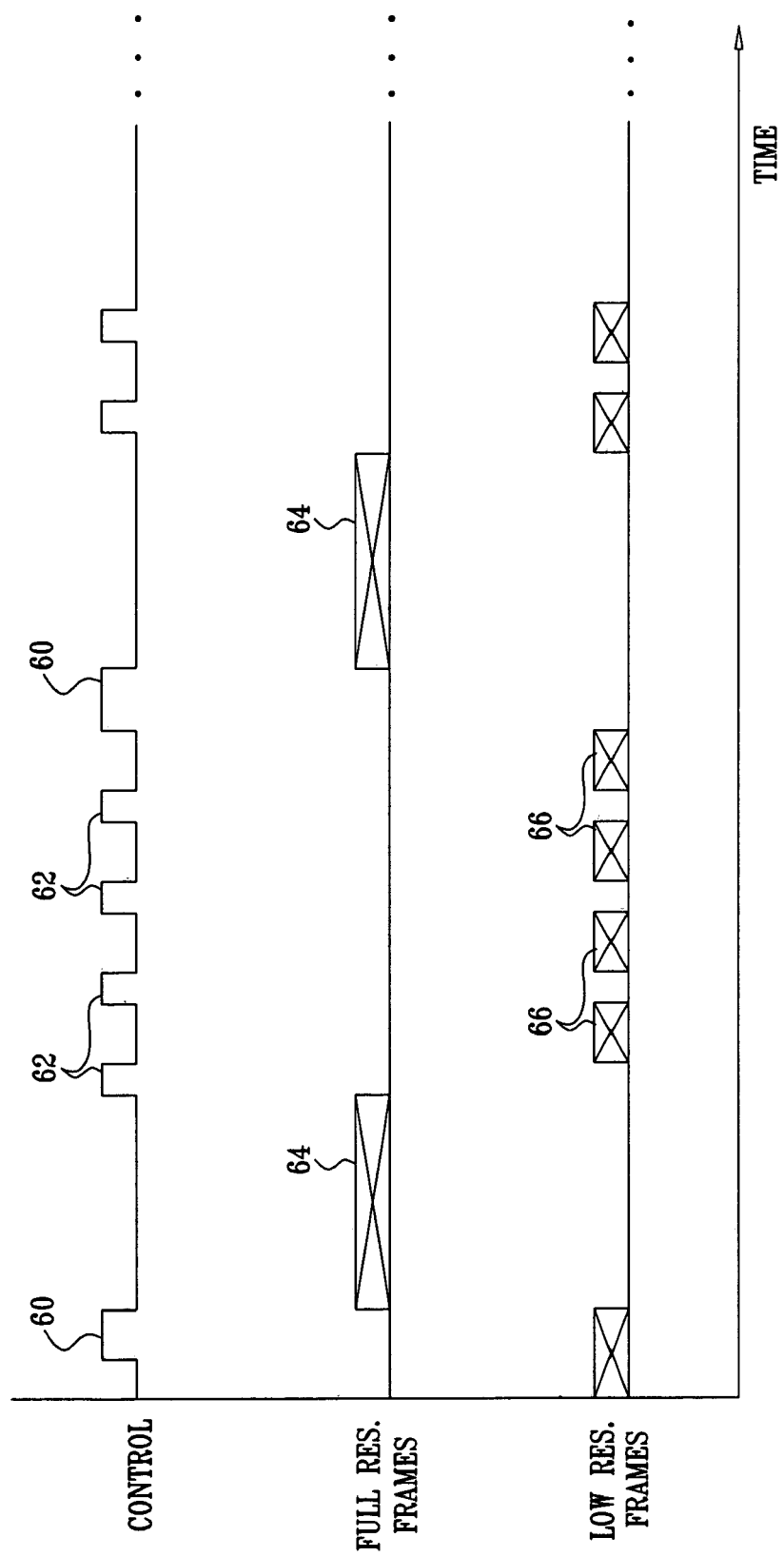
FIG. 5 is a timing diagram that schematically illustrates control signals and video data in the camera of FIG. 4, in accordance with an embodiment of the present invention.

FIG. 5 is a timing diagram that schematically illustrates timing control signals generated by timing generator 50, and corresponding video data output by image sensor 24, in accordance with an embodiment of the present invention. A full-resolution frame signal 60 causes sensor 24 to read out samples from the detector elements in all of the columns and rows of sensor 24, resulting in full-resolution frame data 64 (corresponding to frames 40, as shown in FIG. 3). Low-resolution frame signals 62 cause the image sensor to read out low-resolution frame data 66 (corresponding to frames 42), by skipping selected rows and/or columns during readout. In this example, four low-resolution frames are interleaved following each successive high-resolution frame.

Figure 6:
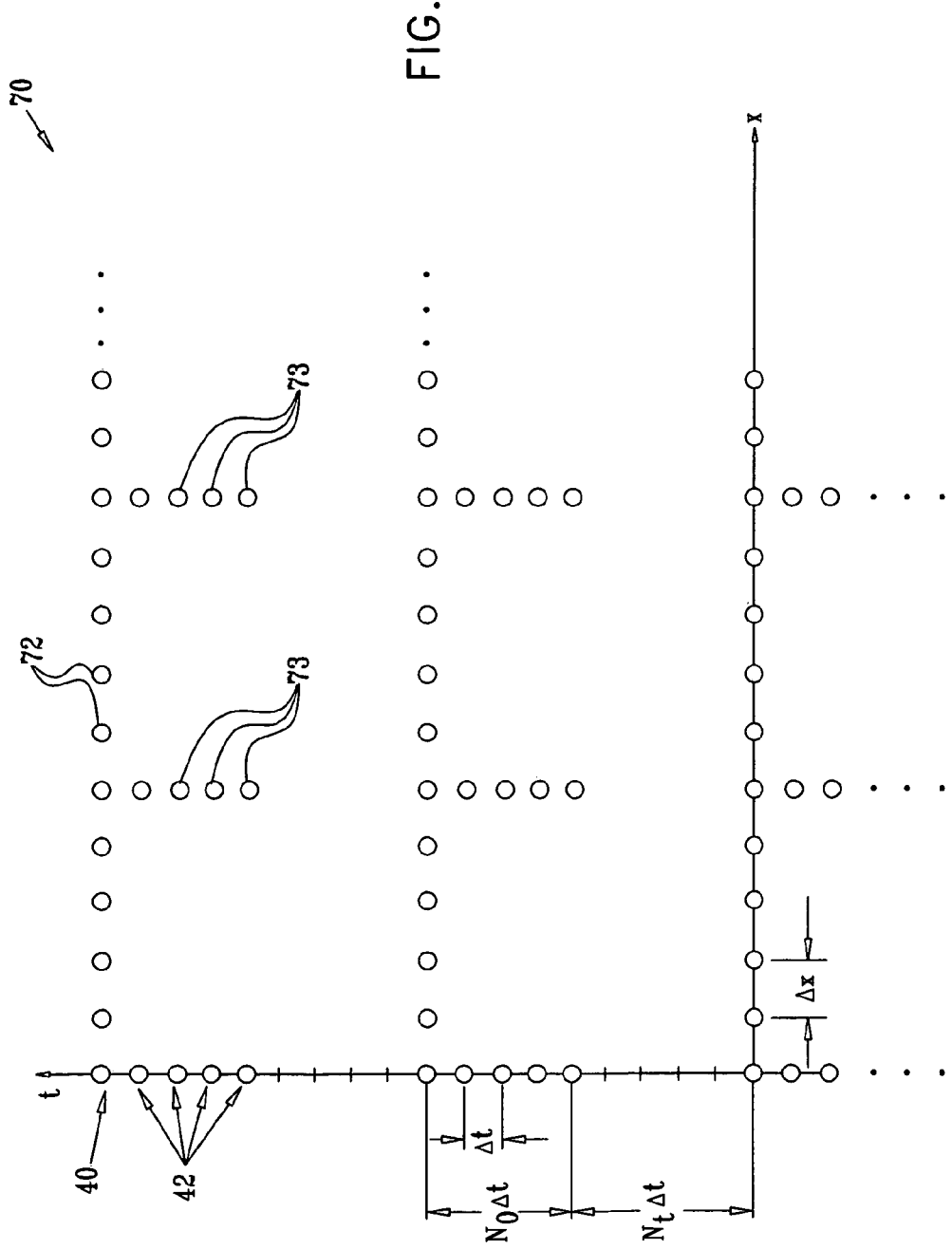
FIG. 6 is a plot that schematically illustrates a spatio-temporal sampling pattern in a variable-resolution sequence of input image frames, in accordance with an embodiment of the present invention.

FIG. 6 is a plot that schematically shows a spatio-temporal sampling pattern 70 generated by sensor 24 in response to the timing control signals of FIG. 5, in accordance with an embodiment of the present invention. In this embodiment, it is assumed that low-resolution frame signals 62 cause sensor 24 to read out every fifth row, while skipping over the four intervening rows. This scheme causes low-resolution frames 42 to be down-sampled by a ratio of 5:1 in the X-direction. All of the columns are read out in every frame, so that there is no down-sampling in the Y-direction (and therefore, for simplicity, the Y-direction is omitted from the illustration of pattern 70 in FIG. 6).

High-resolution frames 40 yield a complete grid of sampling points 72, with spatial separation of $\Delta x$ in the X-direction. In low-resolution frames 42, the spatial separation between neighboring sampling points 73 is $N_x \Delta x$. The separation between sampling points in the Y-direction in all frames is $\Delta y$. In the time domain, the time intervals between frames are non-uniform. After every high-resolution frame 40, a time interval of $N_t \Delta t$ elapses before the first low-resolution frame. This interval is followed by a consecutive sequence of $N_0$ low-resolution frames 42 spaced $\Delta t$ apart. In the present example, $N_x = N_t = 5$ and $N_0 = 4$, but this choice of down-sampling ratios is arbitrary, and there is no requirement that the spatial and temporal down-sampling ratios be the same. Higher or lower down-sampling ratios may be used in either or both of the spatial and temporal domains. Extension of the reconstruction methods described hereinbelow to cases in which $N_y > 1$ will be apparent to those skilled in the art.

Formally, pattern 70 may be represented in terms of a sampling lattice:

$$\Lambda = \{Un : n \in \mathbb{Z}^3\} \quad (1)$$

wherein $\mathbb{Z}$ is the space of all integers, and $$U = \begin{bmatrix} (2L+1)\Delta x & 0 & 0 \\ 0 & \Delta y & 0 \\ 0 & 0 & (2M_1+1)\Delta t \end{bmatrix}. \quad (2)$$

Here $2L+1=N_x$, $N_o=2M$ and $2M_1+1=N_t+N_o$, with $L=M=2$ and $M_1=4$ in the present example. The three-dimensional spatio-temporal sampling pattern corresponding to the sequence of images captured by sensor 24 can then be written as:

$$\Psi = \Lambda \bigcup_{l=1}^{2L} \left\{ \Lambda + \begin{bmatrix} l\Delta x \\ 0 \\ 0 \end{bmatrix} \right\} \quad (3)$$

$$\bigcup_{m=1}^{2M} \left\{ \Lambda + \begin{bmatrix} 0 \\ 0 \\ (m+2(M_1-M))\Delta t \end{bmatrix} \right\}$$

$$= \bigcup_{s=1}^{2(L+M)+1} \{\Lambda + x_s\}$$

wherein $$x_1 = \begin{bmatrix} 0 \\ 0 \\ 0 \end{bmatrix}; \quad x_s = \begin{bmatrix} (s-1)\Delta x \\ 0 \\ 0 \end{bmatrix}$$

for $s = 2, \ldots, 2L+1$ and $$x_s = \begin{bmatrix} 0 \\ 0 \\ (s+2(M_1-M-L)-1)\Delta T \end{bmatrix}$$

for $s = 2(L+1), \ldots, 2(L+M)+1$.

Figure 7:
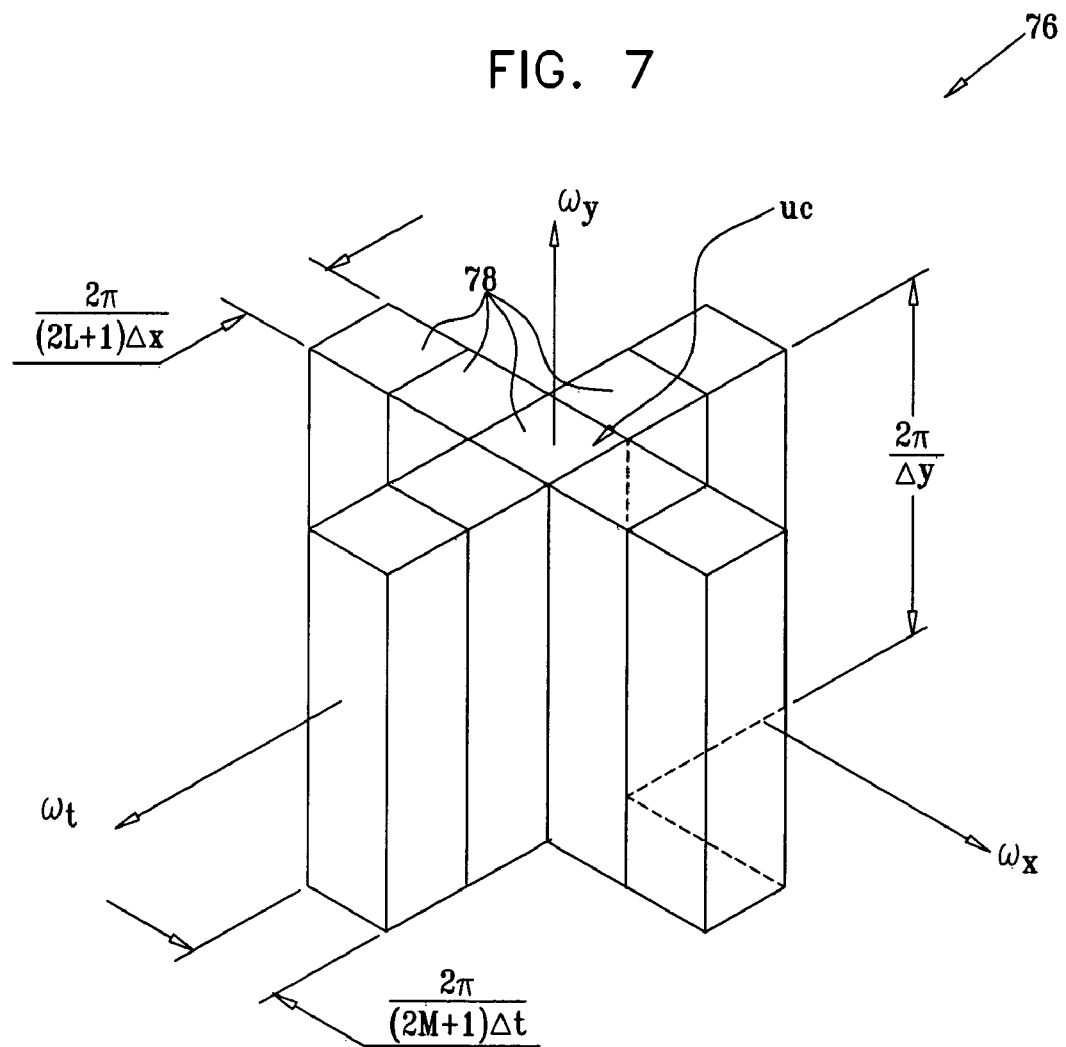
FIG. 7 is a plot that schematically illustrates a volume in the spatio-temporal frequency domain that contains the information gathered using the sampling grid of FIG. 6, in accordance with an embodiment of the present invention.

FIG. 7 is a plot that schematically shows a volume 76 in the spatio-temporal frequency domain that contains the image information sampled by pattern 70. It will be observed that volume 76 has the same general form as volume 32 shown in FIG. 2B (except that the portion of volume 76 along the $\omega_t$ axis is narrowed only in the $\omega_x$-direction, and not the $\omega_y$-direction, since there is no down-sampling in the Y-direction in the spatial domain). The dimensions of volume 76 in the $\omega_x$, $\omega_y$, and $\omega_t$ directions are determined by the inverse of the corresponding sampling intervals in the space and time domains.

Volume 76 comprises an assembly of cells 78, which may be described formally as:

$$S = \bigcup_{r=1}^{2(L+M)+1} \{UC + \omega_r\} \quad (4)$$

The basic unit in this assembly is the unit cell:

$$UC = \left\{ \begin{array}{l} \omega \in \mathbb{R}^3 : |\omega_x| < \dfrac{\pi}{(2L+1)\Delta x}, \\ |\omega_t| < \dfrac{\pi}{(2M_1+1)\Delta t}, |\omega_y| < \dfrac{\pi}{\Delta y} \end{array} \right\}. \quad \text{[equation (5)]}$$

The frequency-space vectors $$\omega_r = \begin{bmatrix} \omega_{x,r} \\ \omega_{y,r} \\ \omega_{t,r} \end{bmatrix} \in \mathbb{R}^3,$$

for r=1, 2, ..., 2(L+M)+1, are given by:

$$\omega_1 = \begin{bmatrix} 0 \\ 0 \\ 0 \end{bmatrix}$$

$$\omega_r = \begin{bmatrix} (r-1)\dfrac{2\pi}{2(L+1)\Delta x} \\ 0 \\ 0 \end{bmatrix} \text{ for } r = 2, 3, \ldots, L+1$$

$$\omega_r = \begin{bmatrix} (L+1-r)\dfrac{2\pi}{2(L+1)\Delta x} \\ 0 \\ 0 \end{bmatrix} \text{ for } r = L+2, \ldots, 2L+1$$

-continued $$\omega_r = \begin{bmatrix} 0 \\ 0 \\ (r-2L-1)\dfrac{2\pi}{(2M_1+1)\Delta t} \end{bmatrix} \text{ for } r = 2L+2, \ldots, 2L+M+1$$

$$\omega_r = \begin{bmatrix} 0 \\ 0 \\ (2L+M+1-r)\dfrac{2\pi}{(2M_1+1)\Delta t} \end{bmatrix} \text{ for } r = 2L+M+2, \ldots,$$

$2(L+M)+1$.

Thus, any three-dimensional space-time signal I(x) that that is band-limited to volume 76 can be reconstructed from its samples its samples on pattern 70. The full-resolution signal may then be reconstructed as follows from the samples $I(Un+x_s)$ on $\Psi$, using a set of three-dimensional filtering functions $\phi_s(x)$:

$$I(x) = \sum_{n\in\mathbb{Z}^3} \sum_{s=1}^{2(L+M)+1} I(Un+x_s)\varphi_S(x - Un). \quad (6)$$

In this equation, the filtering functions $\phi_s(x)$ are given by the transform:

$$\varphi_S(x) = \frac{(2L+1)(2M_1+1)\Delta x \Delta y \Delta t}{(2\pi)^3} \int_{\omega\in UC} \Phi_S(\omega, x) e^{j\omega^T x} d\omega \quad (7)$$

wherein the functions $\Phi_s(\omega, x)$ are the solutions to a set of linear equations based on the structure of volume 76 (S) in the spatio-temporal frequency domain:

$$H(\omega)\begin{bmatrix} \Phi_1(\omega, x) \\ \Phi_2(\omega, x) \\ \vdots \\ \Phi_{2(L+M)+1}(\omega, x) \end{bmatrix} = \begin{bmatrix} \exp(j\omega_1^T x) \\ \exp(j\omega_2^T x) \\ \vdots \\ \exp(j\omega_{2(L+M)+1}^T x) \end{bmatrix} \quad (8)$$

In the above equations, the superscript "T" indicates matrix transposition, and $$H(\omega) = \text{diag}\{\exp(j\omega^T x_s)\} \cdot \quad [\text{equation (9)}]$$

$$\begin{bmatrix} \exp(j\omega_1^T x_1) & \exp(j\omega_1^T x_2) & \cdots & \exp(j\omega_1^T x_{2(L+M)+1}) \\ \exp(j\omega_2^T x_1) & \exp(j\omega_2^T x_2) & \cdots & \exp(j\omega_2^T x_{2(L+M)+1}) \\ \vdots & \vdots & \ddots & \vdots \\ \exp(j\omega_{2(L+M)+1}^T x_1) & \exp(j\omega_{2(L+M)+1}^T x_2) & \cdots & \exp(j\omega_{2(L+M)+1}^T x_{2(L+M)+1}) \end{bmatrix}$$

wherein diag$\{\alpha_s\}$ is a matrix with elements $\alpha_1, \alpha_2, \ldots, \alpha_{2(L+M)+1}$ along the diagonal and zero elsewhere.

Typically, the full-resolution signal I(x) is reconstructed not as a continuous function, but rather at a matrix of sampling points given by $$x_n = \begin{bmatrix} \Delta x & 0 & 0 \\ 0 & \Delta y & 0 \\ 0 & 0 & \Delta t \end{bmatrix} n,$$

wherein $n \in \mathbb{Z}^3$. For computational efficiency, equation (6) may be rewritten as a (three dimensional) convolution operation as follows:

$$I(x) = \sum_{s=1}^{2(L+M)+1} I_s(x) * \varphi_s(x) \quad (10)$$

$$= \sum_{s=1}^{2(L+M)+1} \int_{\eta\in\mathbb{R}^3} I_s(x-\eta)\varphi_s(\eta) d\eta$$

wherein $$I_s(x) = \sum_{n\in\mathbb{Z}^3} I(Un+x_s)\delta(x-Un)$$

and $\delta(x)$ is the three-dimensional Dirac delta function. This convolution may be implemented using digital filtering techniques known in the art. For any given choices of L and M, the filter coefficients may be precomputed using the equations listed above.

Although the techniques described hereinabove refer to monochrome images, these techniques may be extended in a straightforward manner to generation of color video image sequences, as well. In professional-quality video cameras, separate image sensors are typically configured to sense red, green and blue images, respectively, and these separate images are then combined to give a RGB output image. In this case, the sampling and reconstruction methods described above may be applied individually to each of the different color image input sequences. On the other hand, most color video cameras currently on the market use a single image sensor overlaid by a mosaic filter, so that different detector elements receive light of different colors. For example, the well-known Bayer-type mosaic has the form:

$$\begin{matrix} R & G & R & G & \ldots \\ G & B & G & B & \ldots \\ R & G & R & G & \ldots \\ G & B & G & B & \ldots \\ \vdots & \vdots & \vdots & \vdots & \ddots \end{matrix}$$

Other mosaic sensor types are also known in the art.

Figure 8A:
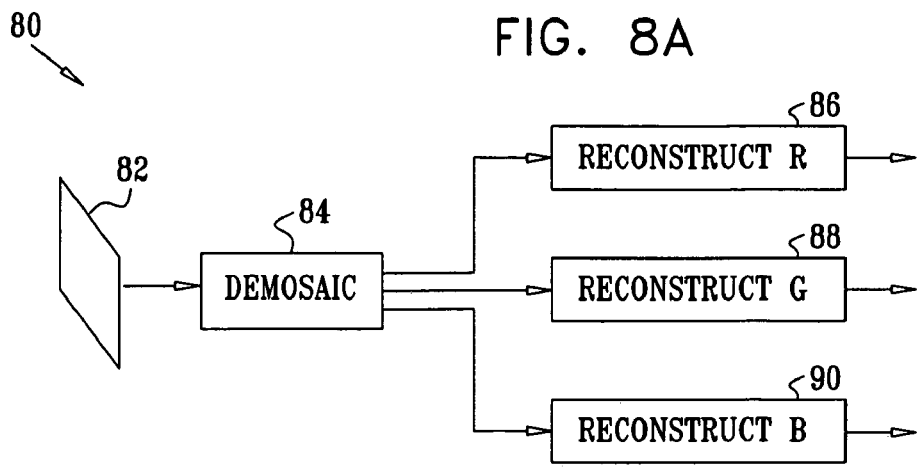
FIGS. 8A-8C are block diagrams that schematically show elements of a color digital video camera with resolution enhancement, in accordance with embodiments of the present invention.
Figure 8B:
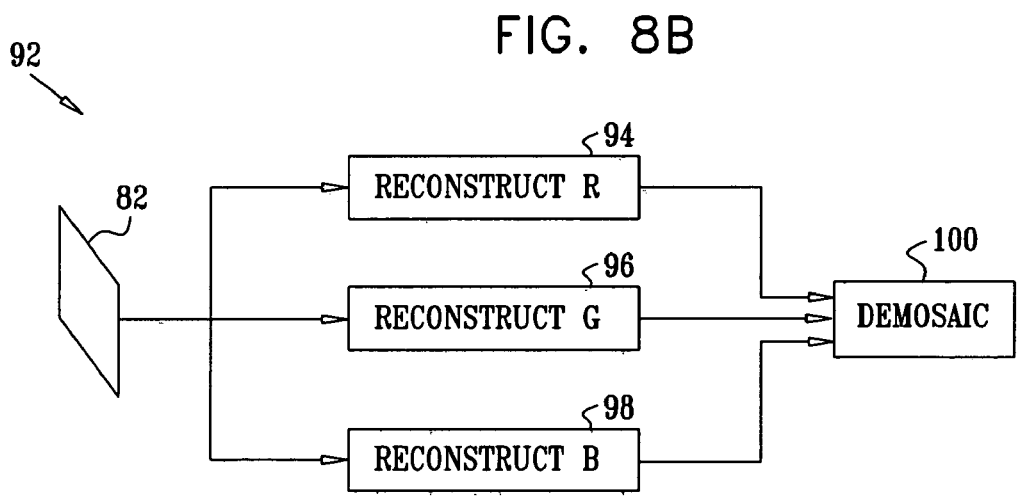
Figure 8C:
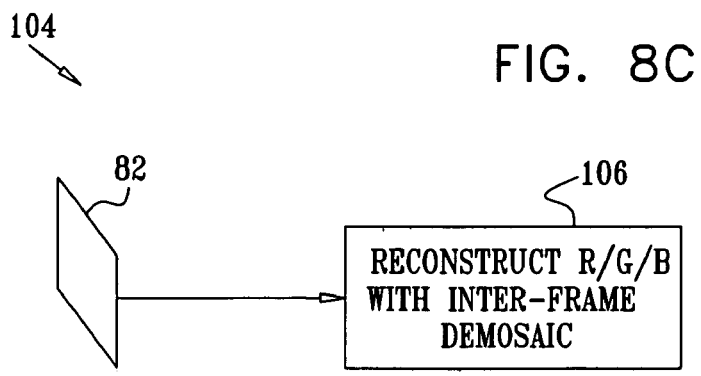

FIG. 8A-8C are block diagrams that schematically show elements of color video cameras with spatio-temporal resolution enhancement using a color mosaic image sensor 82, in accordance with a number of different, alternative embodiments of the present invention. FIG. 8A shows a camera 80, in which a demosaic processor 84 demultiplexes the different color samples in the non-uniform input image sequence generated by sensor 82 in order to produce three separate red, green and blue component input image sequences. (Alternatively, processor 84 may combine neighboring samples by addition and subtraction to generate Y, $C_R$ and $C_B$ luminance/chrominance outputs, as is known in the art.) Each of the separate component input image sequences has non-uniform spatial and temporal resolution, as described above. The separate component image sequences are processed by separate R, G and B reconstruction processors 86, 88, 90 (or Y, $C_R$ and $C_B$ reconstruction processors) to produce enhanced output frames of uniform resolution.

FIG. 8B shows a camera 92 in which R, G and B reconstruction processors 94, 96 and 98 operate directly on the corresponding red, green and blue pixels in each of the input images generated by sensor 82. Processors 94, 96 and 98 produce an output sequence of mosaic images with enhanced, uniform spatial and temporal resolution. A demosaic processor 100 operates on the enhanced mosaic images to generate an enhanced video output.

FIG. 8C shows a camera 104 in which reconstruction and demosaic processing are combined in an integrated processor 106. This processor accepts the sequence of non-uniform mosaic input images from sensor 82 and uses three-dimensional data structures (of the type represented by FIGS. 6 and 7) to reconstruct both intensity (luminance) and color information with enhanced spatial and temporal resolution. This approach, in which information from multiple frames is used in demosaic processing, may provide finer color detail than the approaches of FIGS. 8A and 8B, in which demosaic processing is performed frame by frame.

Although the embodiments described above relate to techniques applied on line, during image acquisition, the principles of the present invention may also be applied, mutatis mutandis, in compression of standard digital video sequences and in enhancing the resolution of sequences of pre-acquired images. Thus, in an alternative embodiment of the present invention, not shown in the figures, a compression processor may operate on a sequence of input images of fixed spatial and temporal resolution. The processor selectively decimates the images in the spatial and temporal domains so as to generate a sequence of images (similar to the sequences represented by FIGS. 3 and 6) of reduced data volume. This compressed sequence may then be stored and/or transmitted over a communication link, and may subsequently be decompressed using the functions of equation (6). The compression and decompression processors that are used for this purpose may comprise one or more dedicated or programmable logic devices, or they may, alternatively or additionally, comprise one or more computers, which are programmed in software to carry out the compression and/or decompression functions. This software may be downloaded in electronic form, over a network, for example, or it may alternatively be provided on tangible media, such as CD-ROM.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for electronic imaging, comprising:
controlling an image sensor to capture a first sequence of first input images at a first frame rate having a first spatial resolution, and to capture a second sequence of second input images, interleaved with the first sequence and having at least one second spatial resolution lower than the first spatial resolution; and
processing the first and second sequences of the input images to generate a third sequence of output images at a second frame rate higher than the first frame rate and having a third spatial resolution higher than the at least one second spatial resolution,
the first and second input images being sampled according to a non-uniform spatio-temporal sampling pattern, and
the processing the first and second sequences comprising determining a spatio-temporal filtering function responsively to the sampling pattern, and applying the spatio-temporal filtering function to the first and second input images.

2. The method according to claim 1, wherein the third spatial resolution is equal to the first spatial resolution.

3. The method according to claim 1, wherein controlling the image sensor comprises capturing the second input images at a third frame rate, which is equal to the second frame rate.

4. The method according to claim 1, wherein the second frame rate is equal to a standard video output rate.

5. The method according to claim 1, wherein the image sensor comprises an array of detector elements arranged in a matrix of rows and columns, and wherein controlling the image sensor comprises capturing the second input images by skipping a subset of at least one of the rows and the columns during readout of the detector elements.

6. The method according to claim 1, wherein applying the spatio-temporal filtering function comprises computing a set of spatio-temporal filtering functions responsively to a structure of the sampling pattern in a spatio-temporal frequency domain, and convolving the first and second input images with the spatio-temporal filtering functions.

7. The method according to claim 1, wherein the image sensor comprises a color mosaic image sensor, and wherein the output images comprise color images.

8. An electronic imaging apparatus, comprising:
an image sensor; and
a sensor controller, which is coupled to control the image sensor so as to capture a first sequence of first input images at a first frame rate having a first spatial resolution, and to capture a second sequence of second input images, interleaved with the first sequence and having at least one second spatial resolution lower than the first spatial resolution,
the sensor controller being adapted to process the first and second sequences of the input images to generate a third sequence of output images at a second frame rate higher than the first frame rate and having a third spatial resolution higher than the at least one second spatial resolution,
the first and second input images being sampled according to a non-uniform spatio-temporal sampling pattern, and
the sensor controller being adapted to apply a spatio-temporal filtering function to the first and second input images, responsively to the sampling pattern, in order to generate the output images.

9. The apparatus according to claim 8, wherein the third spatial resolution is equal to the first spatial resolution.

10. The apparatus according to claim 8, wherein the second input images are captured at a third frame rate, which is equal to the second frame rate.

11. The apparatus according to claim 8, wherein the second frame rate is equal to a standard video output rate.

12. The apparatus according to claim 8, wherein the image sensor comprises an array of detector elements arranged in a matrix of rows and columns, and wherein the sensor controller is adapted to control the image sensor comprises so that the second input images are captured by skipping a subset of at least one of the rows and the columns during readout of the detector elements.

13. The apparatus according to claim 8, wherein the sensor controller is adapted to convolve the first and second input images with a set of spatio-temporal filtering functions that are determined responsively to a structure of the sampling pattern in a spatio-temporal frequency domain.

14. The apparatus according to claim 8, wherein the image sensor comprises a color mosaic image sensor, and wherein the output images comprise color images.

* * * * *